L. HUBBARD
Hollow Iron Rims For
Wagon Wheels

117077

PATENTED JUL 18 1871

ATTEST
Myron H. Church
Charles J. Hunt

INVENTOR
L. Hubbard
per Atty
Thos. S. Sprague

UNITED STATES PATENT OFFICE.

LUCIUS HUBBARD, OF OTTAWA, OHIO.

IMPROVEMENT IN IRON RIMS FOR WAGON-WHEELS.

Specification forming part of Letters Patent No. 117,077, dated July 18, 1871.

*To all whom it may concern:*

Be it known that I, LUCIUS HUBBARD, of Ottawa, in the county of Putnam and State of Ohio, have invented a new and useful Improvement in Hollow Iron Rims for Wagon-Wheels; and I do declare that the following is a true and accurate description thereof, reference being had to the accompanying drawing and to the letters of reference marked thereon, and being a part of this specification, in which—

Figure 1:
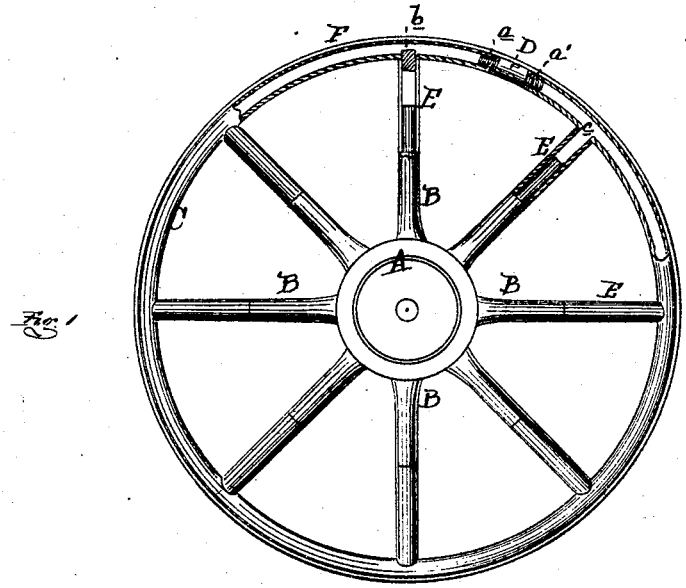
Figure 2:
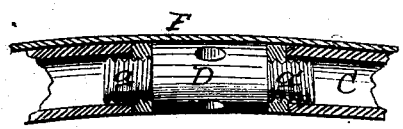
Figure 3:

Figure 1 is an elevation of my wheel, partially in section, and tired for a portion of its circumference. Fig. 2 is an enlarged section of a felly-rim at the junction, and Fig. 3 is a cross-section of the tire used with this felly.

Like letters refer to like parts in each figure.

The nature of this invention relates to an improved construction of the fellies of wagon-wheels in such a manner that the shrinkage of the wheel is confined to the wooden hub alone, and in case the tire should come off the felly and spokes will not break down, as is the case under such circumstances with the ordinary wooden wheel. The invention consists in the means employed for tightening an iron tubular felly in one or more segments, bent to a circular form and connected at the joining ends by right-and-left screws, in connection with a tire grooved on the under or inner face to embrace the said felly; also, in certain metallic sockets for connecting the ends of the spokes with the felly.

In the drawing, A represents a wooden hub, in which are mortised the spokes B in the usual manner. C is a tube, of iron or other metal, bent into a circle, the ends of which have tapped in them the right-and-left female threads $a$ $a'$, with which engages the bolt D, having corresponding threads cut on its extremities, and having its central part squared, that it may be turned by a wrench, or pierced with holes to be turned by a bar or pin, as may be preferred, so that the diameter of the felly may be increased or lessened, as circumstances may require. E are malleable sockets, into which the extremities of the spokes are inserted. At the other end of each socket is a tenon, $b$, which is inserted in a corresponding opening, $c$, in the inner periphery of the tubular felly. F is the tire, which necessarily must be concave on its inner face to embrace the felly, but which form of tire, as such, forms no part of my invention or improvement. In practice, either one complete circle may be made of the tube, or several segments. In the former case the ends of the felly must be sprung apart a little, to permit the tenons to enter their sockets, and then, by turning the screw-bolts, the diameter of the felly may be lessened until it is strained home on the shoulders of the socket-tenons. The tire may now be shrunk on in the usual manner. Should the hub shrink, the cross-bolt may be turned to tighten the felly on the spokes, when, if the tire becomes loose, it may be shrunk on again, as is usual.

It will be readily seen that this form of felly is immensely stronger than one of wood, does not shrink or expand in wet or dry weather, is light and cheap of construction, and in case the tire comes off the wheel will not be destroyed.

What I claim as my invention, and desire to secure by Letters Patent, is—

1. The malleable sockets E provided with tenons $b$, in combination with the tubular felly C and spokes B, as and for the purpose set forth.

2. The construction and arrangement, with relation to the hub A and spokes B of a wheel, of the metallic sockets E, tubular felly C, bolt D, and grooved or concave tire F, as and for the purposes herein shown and set forth.

LUCIUS HUBBARD.

Witnesses:
H. F. EBERTS,
MYRON H. CHURCH.